United States Patent
Carrion et al.

(10) Patent No.: US 10,901,753 B2
(45) Date of Patent: Jan. 26, 2021

(54) APPLICATIONS START BASED ON TARGET DISTANCES

(71) Applicant: HEWLETT-PACKARD DEVELOPMENT COMPANY, L.P., Spring, TX (US)

(72) Inventors: Joao Edwardo Carrion, Rio Grande do Sul (BR); Fabio D. Riffel, Rio Grande do Sul (BR); Roberto Bender, Rio Grande do Sul (BR); Rafael Da Cunha, Rio Grande do Sul (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/490,668

(22) PCT Filed: Apr. 3, 2017

(86) PCT No.: PCT/US2017/025694
§ 371 (c)(1),
(2) Date: Sep. 3, 2019

(87) PCT Pub. No.: WO2018/186820
PCT Pub. Date: Oct. 11, 2018

(65) Prior Publication Data
US 2020/0026529 A1    Jan. 23, 2020

(51) Int. Cl.
*G06F 9/445* (2018.01)
*G06F 9/451* (2018.01)
(Continued)

(52) U.S. Cl.
CPC .......... *G06F 9/44505* (2013.01); *G01S 5/14* (2013.01); *G06F 9/451* (2018.02); *H04N 9/3147* (2013.01); *H04W 64/00* (2013.01); *H04W 92/18* (2013.01)

(58) Field of Classification Search
CPC ... H04W 64/00; H04W 92/18; G06F 9/44505; G06F 9/451; H04N 9/3147; G01S 5/14
See application file for complete search history.

(56) References Cited

U.S. PATENT DOCUMENTS 8,478,816 B2 *  7/2013  Parks ............... H04L 69/329
                                                   709/203
9,219,987 B2    12/2015  Ghosh et al.
(Continued)

OTHER PUBLICATIONS

Bassbouss et al—"Towards a Remote Launch Mechanisms of TV Companion Applications Using iBeacon"—2014 IEEE Annual GCCE~2 pages.

*Primary Examiner* — Marina Lee
(74) *Attorney, Agent, or Firm* — Tong Rea Bentley & Kim LLC

(57) ABSTRACT

In example implementations, a method for starting a companion application on a mobile endpoint device and an apparatus for performing the same is provided. The method is performed by a processor of the mobile endpoint device. The method includes detecting that a distance between the mobile endpoint device and a main computer is less than a target distance. The distance is based on a signal strength of a wireless communication signal between the mobile endpoint device and the main computer. An application that is being executed on the main computer is detected. A companion application is started on the mobile endpoint device that is associated with the application.

12 Claims, 4 Drawing Sheets

(51) Int. Cl.
  *G01S 5/14* (2006.01)
  *H04N 9/31* (2006.01)
  *H04W 64/00* (2009.01)
  *H04W 92/18* (2009.01)

(56) References Cited

U.S. PATENT DOCUMENTS

| | | |
|---|---|---|
| 9,271,143 B2 | 2/2016 | Faenger |
| 9,749,799 B2 * | 8/2017 | Cho ................. H04W 4/70 |
| 10,616,728 B2 * | 4/2020 | Kung ................ H04W 24/04 |
| 2012/0290657 A1 | 11/2012 | Parks et al. |
| 2014/0030982 A1 * | 1/2014 | Cardona ............ G01S 11/06 455/67.11 |
| 2014/0134948 A1 | 5/2014 | Ghose et al. |
| 2014/0136986 A1 | 5/2014 | Martin et al. |
| 2014/0364103 A1 * | 12/2014 | Marti ................ G06F 1/3209 455/418 |
| 2015/0350297 A1 * | 12/2015 | Yang ................. H04L 67/025 715/740 |
| 2015/0371210 A1 | 12/2015 | Chatterjee et al. |
| 2016/0212587 A1 | 7/2016 | Cho et al. |
| 2020/0026529 A1 * | 1/2020 | Carrion ................ G01S 5/14 |

\* cited by examiner

APPLICATIONS START BASED ON TARGET DISTANCES

BACKGROUND

A computer (e.g., a desktop computer or a laptop computer) is still the main computing resource of users. The computer may have the processing capability to run various different applications and programs. The computer has sufficient processing capabilities and memory to execute high productivity applications and programs.

Smart phones and other similar mobile devices have improved in processing capability in recent years. Mobile devices have been programmed to become an extension of the computer. For example, when a user's smart phone rings, the user may be able to answer his or her phone on the computer. In another example, a user may begin working on a document on his or her computer and then use his or her mobile device to continue working on the document on the go. Thus, smart phones and the computer are becoming an integrated environment.

DETAILED DESCRIPTION

The present disclosure relates to an approach of starting an application on a mobile device based on a target distance of the mobile device from a computer and an apparatus for performing the same. As discussed above, smart phones and the computer are becoming an integrated environment. Many times it may be desirable for a user to use his or her smart phone to execute a companion application with an application running on the user's desktop computer.

Currently, a user may manually select and activate the application on his or her mobile endpoint device to work with an application on the user's main computer. This process can be tedious and cumbersome, especially if the user is switching between many different applications on the main computer.

The present disclosure provides an approach that automatically launches a companion application when the mobile device is within a target distance to a main computer. The target distance may be set, or defined, by the user based on a signal strength rather than a set physical distance. The mobile device may be able to detect which application is running when the target distance is reached and automatically launch the companion application.

In addition, the mobile device may automatically detect when the user switches between applications on the main computer. In response, the mobile device may automatically launch the corresponding companion application. In other words, the mobile device may automatically launch the appropriate companion application based on the current application selected in a foreground window of the main computer.

Figure 1:
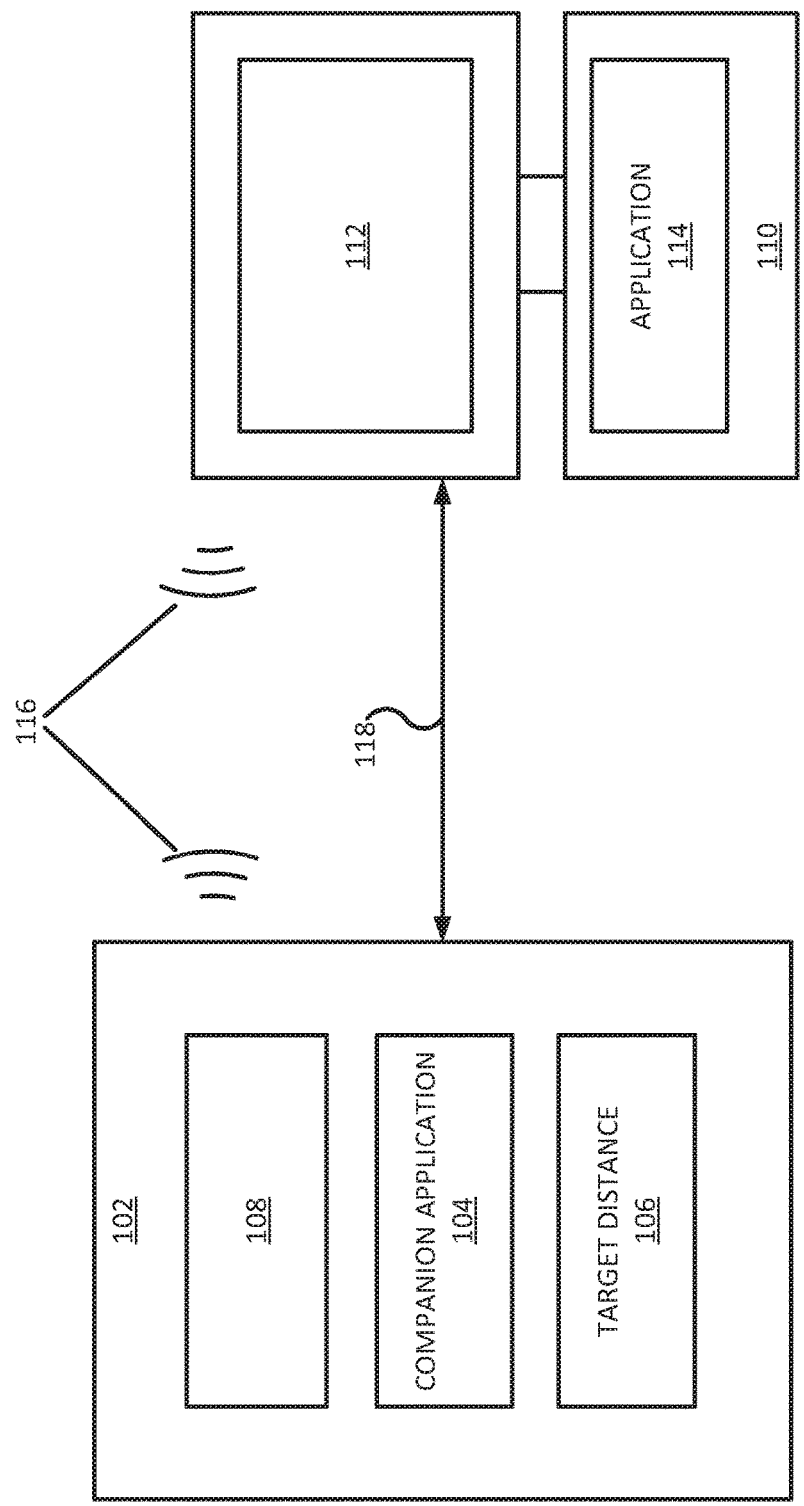
FIG. 1 is a block diagram of an example system for starting an application based on a target distance of the present disclosure.

FIG. 1 illustrates a block diagram of a system 100 for starting an application based on a target distance of the present disclosure. In one implementation, the system 100 may include a mobile endpoint device 102 and a main computer 110. The mobile endpoint device 102 may be a tablet device, a laptop computer, a smart phone, or the like that is modified to perform the functions described herein. The main computer 110 may be a desktop computer, another laptop computer, or the like.

In one example, the main computer 110 may have a display 112 and execute an application 114 that may be stored in memory. Although a single application 114 is illustrated in FIG. 1, it should be noted that the main computer 110 may have a plurality of applications 114 that can be stored in memory and executed by the main computer 110. The main computer 110 may have wireless communication capability. In one example, the wireless communication capability may include a short wave radio transceiver (e.g., a Bluetooth® radio).

In one example, the mobile endpoint device 102 may include a companion application 104 and a target distance 106 stored in memory. The mobile endpoint device 102 may also include a display 108. The display 108 may provide a user interface (e.g., via a touch screen display). In another example, the user interface may be a physical keyboard or touch pad (not shown) on the mobile endpoint device 102.

In one example, the companion application 104 may be an application that is stored on the mobile endpoint device 102. The application may be selected by a user to be the companion application 104 via the user interface that is displayed on the display 108. Although a single companion application 104 is illustrated in FIG. 1, it should be noted that a plurality of different companion applications may be selected by a user and stored in memory of the mobile endpoint device 102.

In one example, the companion application 104 may be a mobile application that is not related to the application 114. For example, the application 114 may be photo editing application that is shown on the display 112 and the companion application 104 may be selected to be a photo album of the mobile endpoint device 102. In another example, the application 114 may be an Internet browser shown on the display 112 and the companion application 104 may be a third party map application on the mobile endpoint device 102.

In another example, the companion application 104 may be associated with the application 114. For example, the application 114 may be a video game shown on the display 112 and the companion application 104 may be a heads up display or mini map on the mobile endpoint device 102. In another example, the application 114 may be a video editing software shown on the display 112 and the companion application 104 may be additional user interface buttons and menus on the mobile endpoint device 102.

In one example, the mobile endpoint device 102 may also have wireless communication capability. For example, the wireless communication capability may include a short wave radio transceiver (e.g., a Bluetooth® radio). In one example, the mobile endpoint device 102 may communicate with the main computer 110 via wireless communication signals 116 using the wireless communication capability.

In one example, the mobile endpoint device 102 may be configured to automatically launch the companion application 104 when the mobile endpoint device 102 is within the target distance 106 of the main computer 110. In one example, the target distance 106 may be defined by a signal strength of the wireless signals 116. Said another way, the signal strength measured in dB-microvolts per meter (dBµV/m), decibel-milliwatts (dBm), or RSSI (Received Signal Strength Indicator—manufacturer dependent) may set the target distance 106.

In one implementation, the target distance 106 may be defined by a user. For example, the display 108 may provide a user interface to allow a user to perform an initialization process to set the target distance 106 based on the signal strength of the wireless signal 116. In one example, the user may place the mobile endpoint device 102 at a distance 118 from the main computer 110. The signal strength of the wireless signals 116 at the distance 118 may be measured and used to set the target distance 106. In one example, a signal strength threshold may be set based on the signal strength of the wireless signals 116 at the target distance 106 that is set. Thus, target distance 106 may be met when the signal strength of the wireless signals 116 is greater than or equal to the signal strength threshold of the wireless signals 116 set during the initialization process, even though the distance 118 may change.

In one example, when the mobile endpoint device 102 is within the target distance 106 of the main computer 110, the mobile endpoint device 102 may receive information regarding the application 114 that is being executed on the main computer 110. For example, the information may be exchanged automatically via the wireless signals 116. The mobile endpoint device 102 may determine any companion applications are stored on the mobile endpoint device 102 that are associated with the application 114. If the companion application 104 associated with the application 114 is identified, the mobile endpoint device 102 may automatically launch or execute the companion application 104.

In one implementation, the user may change the application 114 that is being executed by the main computer 110 and displayed on the display 112. In response, the mobile endpoint device 102 may automatically detect the changed application 114 and launch or execute the companion application 104 associated with the changed application 114.

For example, when the application 114 is changed, a signal may be transmitted to the mobile endpoint device 102 via the wireless signals 116. The mobile endpoint device 102 may check the stored companion applications 104 to determine if another companion application 104 is associated with the currently selected application 114 being executed on the main computer 110. If a companion application 104 is identified, the companion application 104 may be automatically launched.

To illustrate, the first application 114 may be a photo editing software. The mobile endpoint device 102 may be moved within the target distance 106 of the main computer 110. As a result, the mobile endpoint device 102 may automatically launch a photo album that is selected as the companion application 104 of the first application 114. The user may select photos in the photo album of the mobile endpoint device 102 that are then automatically transmitted to the main computer 110 and displayed in the display 112 for the photo editing software.

At a later time, the user may decide to play a video game. As a result, the user may change to a second application 114 that is a video game. The mobile endpoint device 102 may receive a signal from the main computer 110 indicating that the application 114 has been changed from the photo editing software to the video game. In response, the mobile endpoint device 102 may automatically launch or execute a mini map application that is selected to be the companion application 104 of the second application 114. Thus, the display 112 may show the video game while the display 108 may show a mini map associated with the video game.

In one example, the user may be provided options to turn on or off the companion application 104. For example, there may be instances where the user does not wish to have the mobile endpoint device 102 automatically launch the companion application 104.

In another example, if the signal strength of the wireless signals 116 changes to be below the signal strength set during the initialization process, the display 108 may provide a notification to the user to move the mobile endpoint device 102. For example, interference may occur and the user may be instructed to move the mobile endpoint device 102 closer to the main computer 110 to be within the target distance 106. In another example, the notification may simply state that the main computer 110 is not detected within the target distance 106 and that the companion application 104 is being automatically closed.

Figure 2:
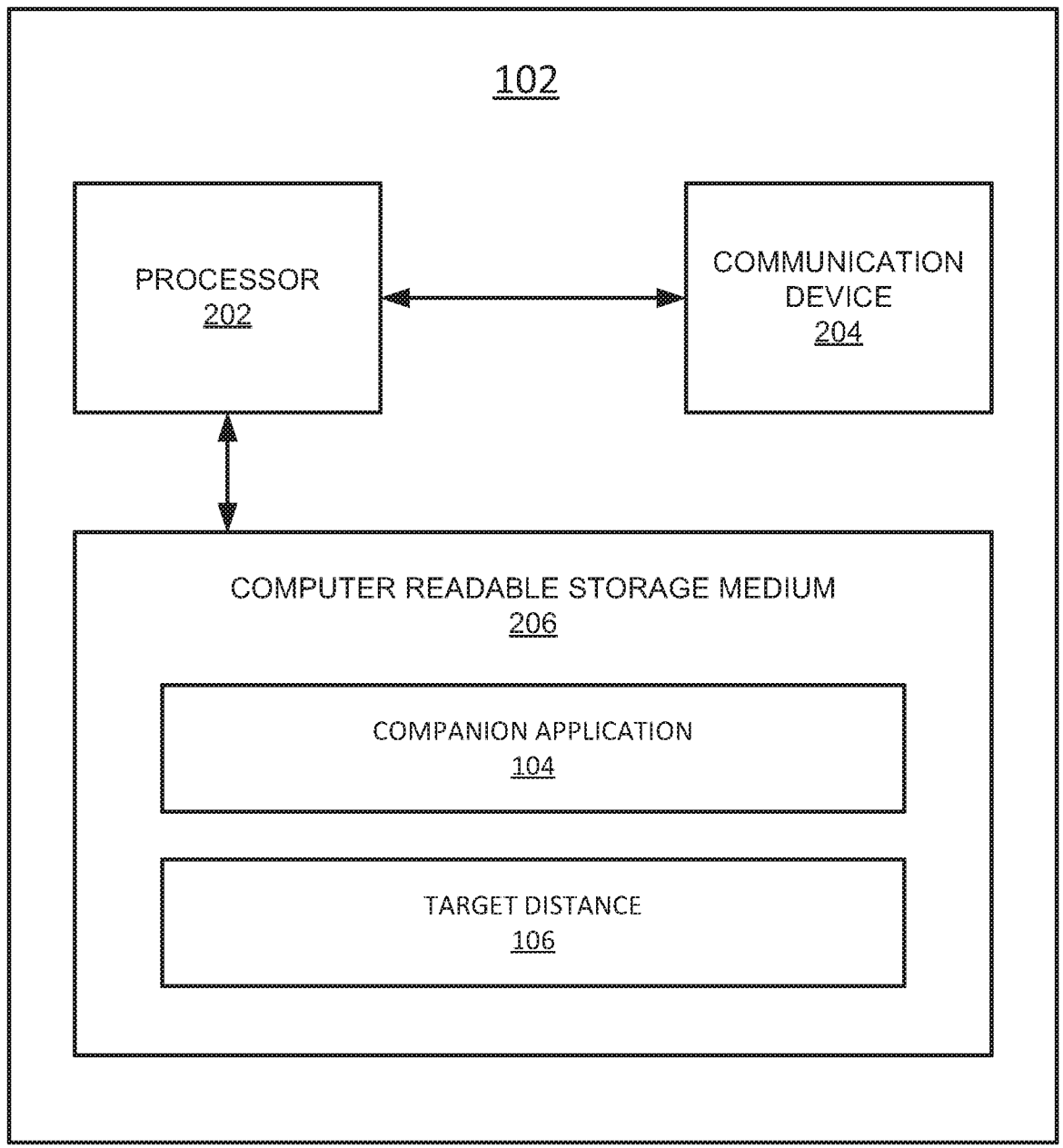
FIG. 2 is a block diagram of an example mobile endpoint device that automatically starts an application based on a target distance of the present disclosure.

FIG. 2 illustrates another block diagram of the mobile endpoint device 102. In one example, the mobile endpoint device 102 may include a processor 202, a communication device 204 and a computer readable storage medium 206. In one example, the processor 202 may be communicatively coupled to the communication device 204 and the computer readable storage medium 206.

In one implementation, the communication device 204 may be a wireless communication device that can establish a wireless two-way communication path with a wireless communication device of the main computer 110. In one example, the communication device 204 may be a Bluetooth® radio.

In one implementation, the computer readable storage medium 206 may store the companion application 104 and the target distance 106. The computer readable storage medium 206 may also store instructions associated with the user interface for providing the initialization process to set the target distance, the signal strength threshold based on a signal strength at the target distance, the user interface to select the mobile applications that will be companion applications 104, and the like.

In one example, the processor 202 may perform instructions stored on the computer readable storage medium 206. For example, the processor 202 may calculate the signal strength of the wireless signals 116 when set at the distance 118 during the initialization process. The processor 202 may receive and transmit signals via the communication device 204 to and from the main computer 110 to execute the companion application 104, detect when the application 114 is changed on the main computer 110, and the like.

In one example, the processor 202 may also be communicatively coupled to the display 108. For example, the processor 202 may control what images of the companion application 104 are shown on the display 108.

Thus, the mobile endpoint device 102 may be modified to automatically start the companion application 104 when the mobile endpoint device 102 is within the target distance 106 of the main computer 110. The companion application 104 that is launched may be based on an association with the application 114 that is being executed on the main computer 110. As a result, the user can seamlessly use the mobile endpoint device 102 as an extension of the main computer 110 to increase efficiency, productivity or the overall user experience for certain applications.

It should be noted that FIGS. 1 and 2 are simplified for ease of explanation. For example, the system 100, the main computer 110 and the mobile endpoint device 102 may include additional components that are not shown. For example, the main computer 110 may also include a processor, a computer readable medium, a communication device, a video card, and the like. The mobile endpoint device 102 may include audio outputs, other input/output interfaces, hardware buses, communication ports, and the like.

Figure 3:
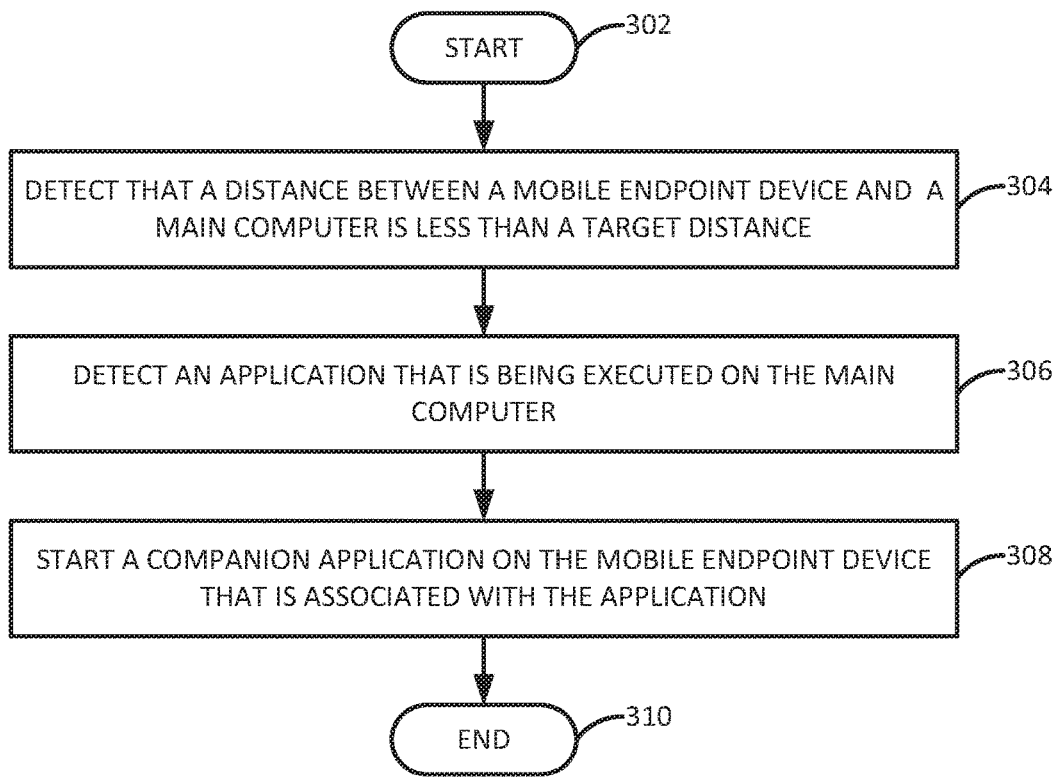
FIG. 3 is a block diagram of an example method for starting an application based on a target distance.

FIG. 3 illustrates a flow diagram of an example method 300 for starting an application based on a target distance. In one example, the method 300 may be performed by the mobile endpoint device 102 or an apparatus 400 described below and illustrated in FIG. 4.

At block 302, the method 300 begins. At block 304, the method 300 detects that a distance between a mobile endpoint device and a main computer is less than a target distance, wherein the distance is based on a signal strength of a wireless communication signal between the mobile endpoint device and the main computer. The target distance may be set by a user during an initialization process. For example, the user may place the mobile endpoint device at a particular distance from the main computer during the initialization process and press an input via a user interface of the mobile endpoint device to confirm the distance. The mobile endpoint device may determine the signal strength of the wireless communication signal at the set distance. The signal strength at the set distance may be stored as the target distance.

At block 306, the method 300 detects an application that is being executed on the main computer. For example, information may be exchanged via the wireless communication signals. The information may include a current application that is being executed on the main computer.

In one implementation, the information may allow the mobile endpoint device to identify the application being executed in a foreground window of the main computer. For example, the main computer may execute multiple different applications simultaneously. Thus, the mobile endpoint device may use the information associated with the application in a selected foreground window of the main computer.

At block 308, the method 300 starts a companion application on the mobile endpoint device that is associated with the application. In one example, the companion application may be a mobile application on the mobile endpoint device that is selected to be the companion application for the application that is being executed on the main computer. For example, the user may select different mobile applications on the mobile endpoint device to be the companion application for different applications that are on the main computer.

In one implementation, the mobile application that is selected to be the companion application may be unrelated to the application on the main computer. For example, the mobile application may be a camera roll of photos related to an operating system of the mobile endpoint device and the application on the main computer may be a third party photo editing software.

In one implementation, the mobile application that is selected to be the companion application may be related to, or associated with, the application on the main computer. For example, the application on the main computer may be a video game and the mobile application may be a mini-map or a heads-up display associated with the video game.

The mobile endpoint device may use the information associated with the application in the foreground window of the main computer to determine the companion application that is associated with the application. For example, the mobile endpoint device may check the user selected companion applications stored in memory to determine if any of the companion applications are associated with the application on the main computer. If a match is found, the mobile endpoint device may automatically launch or execute the companion application.

In one implementation, the user may decide to change the application that is being executed on the main computer. For example, the different application in a different window of the main computer may be selected, a new application may be executed, and the like. When the different application is selected, the blocks 306 and 308 may be repeated in response to detecting the different application being selected on the main computer.

For example, the mobile endpoint device may detect a change in the selected foreground window in the main computer. In some implementations, when a new application in a different window is selected as the foreground window, the main computer may send information automatically to the mobile endpoint device via the wireless signals in response to the change. The mobile endpoint device may identify the second application, or different application, that is being executed by the main computer based on the information that is received. The mobile endpoint device may then start the second, or different, companion application that is associated with the second application automatically in response to the change in the selected foreground window on the main computer. At block 310, the method 300 ends.

Figure 4:
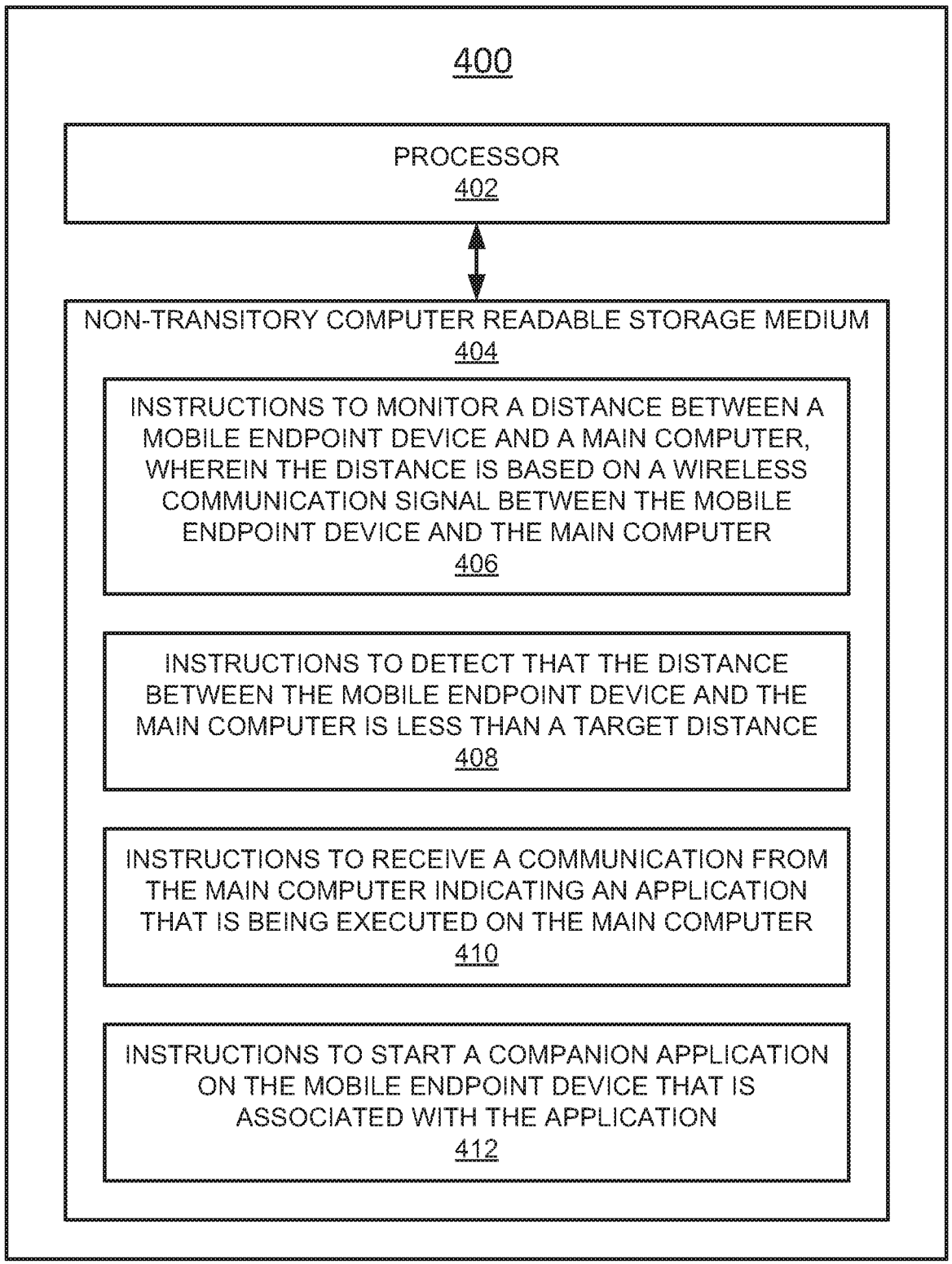
FIG. 4 is an example non-transitory computer readable medium storing instructions executed by a processor for starting an application based on a target distance of the present disclosure.

FIG. 4 illustrates an example of an apparatus 400. In one example, the apparatus 400 may be the mobile endpoint device 102. In one example, the apparatus 400 may include a processor 402 and a non-transitory computer readable storage medium 404. The non-transitory computer readable storage medium 404 may include instructions 406, 408, 410 and 412 that when executed by the processor 402, cause the processor 402 to perform various functions.

In one example, the instructions 406 may include instructions to monitor a distance between the mobile endpoint device and a main computer, wherein the distance is based on a wireless communication signal between the mobile endpoint device and the main computer. The instructions 408 may include instructions to detect that the distance between the mobile endpoint device and the main computer is less than a target distance. The instructions 410 may include instructions to receive a communication from the main computer indicating an application that is being executed on the main computer. The instructions 412 may include instructions to start a companion application on the mobile endpoint device that is associated with the application.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
    receiving, by a processor of a mobile endpoint device, a user-defined selection of a mobile application as a companion application associated with an application being executed on a main computer prior to detecting an application executing on a main computer, storing, by the processor, the user-defined selection of the mobile application and a target distance in memory of the mobile endpoint device;

detecting, by the processor of the mobile endpoint device, that a distance between the mobile endpoint device and the main computer is less than the target distance, wherein the distance is based on a signal strength of a wireless communication signal between the mobile endpoint device and the main computer;

detecting, by the processor, the application that is being executed on the main computer;

responsive to the detecting of the application, retrieving, by the processor, the user-defined selection of the mobile application associated with the application from the memory;

starting, by the processor, the mobile application on the mobile endpoint device that is associated with the application.

2. The method of claim 1, wherein the mobile application that is selected is associated with the application on the main computer.

3. The method of claim 1, wherein the mobile application that is selected is unrelated to the application on the main computer.

4. The method of claim 1, wherein the target distance is set based on the signal strength via an input when the mobile endpoint device is placed at a particular location relative to the main computer.

5. The method of claim 1, wherein the detecting the application, comprises:
identifying, by the processor, the application being executed in a foreground window of the main computer.

6. The method of claim 1, comprising:
detecting, by the processor, a change in a selected foreground window in the main computer;
identifying, by the processor, a second application that is being executed by the main computer; and
starting, by the processor, a second companion application that is associated with the second application automatically in response to the change in the selected foreground window on the main computer.

7. An apparatus, comprising:
a radio transceiver to establish a wireless two-way communication path to a main computer;
a user interface touch screen display to receive a selection of a mobile application that is identified as a companion application prior to the establishing of the wireless two-way communication path;
a computer readable storage medium to store the selection of the mobile application that is identified as the companion application to an application of the main computer; and
a processor in communication with the radio transceiver and the computer readable storage medium, wherein the processor stores the selection of the mobile application and a target distance prior to the establishing of the wireless two-way communication path and starts the mobile application associated with the application being executed on the main computer when a signal strength of the wireless two-way communication path is less than the target distance that is established based on a particular signal strength of a wireless signal that is transmitted over the wireless two-way communication path.

8. The apparatus of claim 7, comprising:
a touch screen display to receive an input when the apparatus is placed at a particular location relative to the main computer to set the target distance based on the signal strength at the particular location.

9. The apparatus of claim 7, wherein the processor receives a communication signal from the main computer indicating the application being executed on a foreground window of the main computer via the two-way communication path.

10. A non-transitory computer readable storage medium encoded with instructions executable by a processor of a mobile endpoint device, the non-transitory computer-readable storage medium comprising:
instructions to receive a user-defined selection of a mobile application as a companion application associated with an application being executed on a main computer prior to detecting the main computer;
instruction to store the user-defined selection of the mobile application and a target distance in memory of the mobile endpoint device;
instructions to monitor a distance between the mobile endpoint device and the main computer, wherein the distance is based on a wireless communication signal strength between the mobile endpoint device and the main computer;
instructions to detect that the distance between the mobile endpoint device and the main computer is less than the target distance;
instructions to receive a communication from the main computer indicating an application that is being executed on the main computer;
instructions to retrieve the user-defined selection of the mobile application associated with the application from the memory responsive to the receiving the communication; and
instructions to start the mobile application on the mobile endpoint device that is associated with the application.

11. The non-transitory computer readable storage medium of claim 10, comprising:
instructions to display via a user interface directions to place the mobile endpoint device at a desired distance from the main computer;
instructions to receive an input via the user interface to set the target distance at the desired distance; and
instructions to store a signal strength threshold associated with the target distance.

12. The non-transitory computer readable storage medium of claim 10, comprising:
instructions to detect a change in a selected foreground window in the main computer;
instructions to identify a second application that is being executed by the main computer; and
instructions to start a second companion application that is associated with the second application automatically in response to the change in the selected foreground window in the main computer.

* * * * *